3,212,960
ASBESTOS-GLASS FIBER SATURATING PAPER CONTAINING THERMOPLASTIC RESIN AND ALUMINUM ACID PHOSPHATE
Robert G. Quinn, Bound Brook, N.J., assignor to Johns-Manville Corporation, New York, N.Y., a corporation of New York
No Drawing. Filed Dec. 4, 1962, Ser. No. 242,110
9 Claims. (Cl. 162—145)

This invention relates to saturating paper for use in plastic molding, and more particularly relates to an improved asbestos paper or felt for saturation with plastic molding compositions and to resin saturated moldable materials comprising the same.

Plastic molding techniques frequently comprise saturating a material or body such as sheets of paper or fibrous felts, cloth, or the like, with a resin and forming or fabricating an object or article with one or more plies of the resin saturated material prior to or simultaneous with curing of the resin. To provide adequate and good product strength the paper or felt, cloth, or the like material, must be of a nature to take up and retain relatively high proportions of binding and/or matrix producing resins. Saturating papers or fibrous felts formed or otherwise induced with properties providing high capacities for resin saturants essential for ultimate products strength, as for example the property of high bulk, typically are weak or marginal in wet strength and in turn present difficulties in many common saturating procedures and/or in handling wet, uncured materials.

It is a primary object of this invention to provide an improved asbestos saturating paper which has good saturating properties and a high capacity for resin saturants including high viscosity resins, and which also possesses high wet strength characteristics enabling saturation with high ratios of resin as for example resins in amounts of up to 60% or 70% by weight of the paper, by means of common saturating techniques including the use of high drying towers, and permitting normal factory handling in manufacture or fabrication of products therefrom.

It is a more specific object of this invention to provide an asbestos paper with the property of high bulk, when measured as the ratio of caliper or thickness to weight, of at least 0.30 and preferably about 0.40 ranging up to about 0.60 whereby it has a capacity to take up and retain viscous resin saturants in amounts of about 40% to 65% of its weight, and which has decidedly higher wet strength and resistance to high temperatures than comparable saturating sheets.

These and other objects and advantages of this invention will become more apparent from the hereinafter detailed description thereof.

This invention comprises saturating papers composed of a major proportion of highly refined harsh asbestos fibers and a minor proportion of glass fibers of fine diameter with thermoplastic resin binder and containing aluminum acid phosphate solids. Paper so composed provides a high wet strength and heat resistant, high resin capacity product, and can be conveniently formed in a conventional paper manufacturing procedure. For instance, the asbestos and glass fibers along with the thermoplastic binder, preferably in aqueous emulsion form, are mixed in a paper beater or other suitable pulping or mixing device, reduced to sheet form on a conventional cylinder mold paper making machine, followed by the usual pressing and drying. Aluminum acid phosphate solids are applied as an aqueous solution to the paper product and upon drying the paper is ready for resin saturation.

The specific composition of the improved saturating papers of this invention is approximately as follows:

| Constituents | Percent by Weight | Preferred Range, Percent by Weight |
|---|---|---|
| Asbestos fiber | 60–91.5 | 75–90 |
| Glass fiber | 5–25 | 8–20 |
| Thermoplastic resin binder | 2–10 | 2–5 |
| Aluminum acid phosphate solids | 1.5–15 | 2–10 |

The asbestos component of the paper of this invention comprises those fibers which are designated in the trade as "harsh," and are composed of asbestos of the groups designated as chrysotile, crocidolite and amosite. A typical and highly preferred asbestos fiber of this type is chrysotile fiber from the Munro mine in Ontario, Canada, of a Group 3 or 4 fiber classification, Quebec Standard Testing Procedure. The asbestos, moreover, should be refined to the point whereby the fibers are very low in fines and sized not more than about 30% by weight less than 200 mesh standard screen sieve, and of the remaining 70% or so sized above 200 mesh, at least about 50% by weight thereof is sized so as to pass 28 mesh standard screen sieve but be retained on the 100 mesh standard screen sieve, based on the standard Bauer-McNett system of fiber classification. It is also highly desirable that the fibers be well opened to the point of substantial elimination of pencils or bundles of asbestos fibers of $\frac{1}{32}$ inch or more in diameter. The suitability of asbestos fiber in this respect is readily ascertainable by the Schopper-Riegler freeness test, and pursuant to this test asbestos fiber for use in this invention should have a freeness value of between approximately 500 and 560.

The glass fiber comprises a fibrous glass of fine diameter having an average fiber cross-section dimension of less than about 3 microns, for example in the range of about 3 to 0.1 microns, and preferably about 1 to ½ micron. The composition of the glass is not normally an essential consideration. However, when the saturated paper is to be employed in the fabrication of very high temperature installations, for example ablative type thermal insulation as used in and about rocket engines or nozzles, the glass should be of a high-temperature-resistant composition such as a substantially pure silica glass.

The resinous binder constituent comprises any one or combination of conventional thermoplastic resins common to the trade, and in particular includes vinyl resins such as polyvinyl chloride resins, acrylic resins such as methyl, ethyl, butyl and hexyl esters of acrylic or methacrylic acid, copolymers or mixtures thereof, cellulose ethers or esters, and similar non-fibrous resinous materials which are compatible with asbestos and the balance of the constituents of this paper and provide cohesive strength therein. Preferably the resins are employed in the form of aqueous emulsions whereby they may be readily dispersed throughout an aqueous suspension of fibrous constituents in a paper beater.

The aluminum acid phosphate treatment or solids contents of the foregoing paper can be effected by combining hydrated alumina with phosphoric acid to form primary, or secondary, or tertiary phosphates with the aluminum oxide to phosphoric acid in a typical ratio of 1:3 to 2:3. The aluminum acid phosphates formed are water soluble and readily applicable in aqueous solution. It is generally understood that these phosphates react with the asbestos, and possibly with some glass compositions, providing a reaction product(s). Commercially available aluminum acid phosphates suitable for this application are sold under the trade designation Alkophos, a product of Monsanto Chemical Company.

Without limiting this invention to any theory as to the mechanism thereof, or function of the respective components, but rather for the purpose of illustration, it is believed that the marked upgrading of the strength of the paper of this invention, while maintaining its high saturating capacity, is due primarily to the cooperative effect of the specific combination of ingredients as the elimination of any one results in the loss of a basic property or function. For instance, the omission of the glass fiber results in a paper of lower saturating capacity as evidenced by about a 10% reduction in kerosene absorption, and, on the other hand, the absence of the aluminum acid phosphate produces an appreciable loss in wet strength, whereas the novel combination of given materials provides a saturating paper of enhanced capacity and appreciably increased strength over the prior asbestos and resin binder papers.

The following comprises a specific illustration of examples of preferred and typical means of this invention and demonstrates the pronounced effects thereof. It is to be understood, however, that the specific materials and/or proportions thereof are primarily exemplary and are not to be construed as limiting the invention to any particularly material, their ratios, and/or data recited hereinafter.

A number of samples of paper compositions, including standard or control samples based upon commercial high bulk saturating paper formulations, were prepared for a comparative evaluation of their relative properties. In each case the asbestos content was a Grade 3W, Quebec Standard Testing Procedure, chrysotile fiber, and an aqueous emulsion of acrylic resin—Rhoplex W-9, product of Rohm & Haas Co.—was employed as the binder. The asbestos fiber was sized at least about 70% by weight thereof retained on 200 mesh standard screen sieve and with at least about one-half of the plus 200 mesh standard screen sieve fiber passing 28 mesh standard screen sieve but retained on 100 mesh standard screen sieve. The glass fiber employed in those papers comprising the same had an average diameter of about 1 micron, and the aluminum acid phosphate solids-containing papers were prepared by treating the formed paper with aqueous solutions of aluminum acid phosphate formed by diluting approximately one part by weight of aluminum hydrate to three parts by weight of 85% phosphoric acid. In Example I all paper samples were hand sheets produced produced on laboratory equipment and the papers of Example II were produced on a pilot plant or simulated commercial paper forming machine.

EXAMPLE I

A series of paper samples of three compositions—No. 1 being the standard or control and Nos. 2 and 3 each including fine glass fiber in lieu of an equivalent proportion of the asbestos—were prepared by hand sheet molding to ascertain the relative properties of each. The hand sheets were formed pursuant to standard laboratory techniques and apparatus, i.e., aqueous slurries of the constituents of each formula were prepared in a laboratory beater, the sheets, vacuum filter molded from the slurry, pressed and dried, each under identical conditions. The sample formulations were:

| Composition | No. 1, percent | No. 2, percent | No. 3, percent |
|---|---|---|---|
| Chrysotile fiber, Grade 3W | 97 | 87 | 72 |
| Fine glass fiber | | 10 | 25 |
| Acrylic resin | 3 | 3 | 3 |

Three sheets of each of samples Nos. 2 and 3 were dipped in 3% and 5% by weight aqueous solutions of aluminum acid phosphate. The aluminum acid phosphate solids pick-up was, based on the original sheet weight, as given:

| | No. 2, percent | No. 3, percent |
|---|---|---|
| Three percent solution | 5.9 | 9.2 |
| Five percent solution | 8.3 | 11.7 |

The average physical properties of these untreated and treated papers of different and like compositions were as set forth in Table I.

Table I

| Physical Properties | No. 1 Control | No. 2 Regular | No. 2 +3% Dip | No. 2 +5% Dip | No. 3 Regular | No. 3 +3% Dip | No. 3 +5% Dip |
|---|---|---|---|---|---|---|---|
| Basis wt., lbs./100 ft.$^2$ | 2.36 | 2.38 | 2.63 | 2.65 | 2.37 | 2.65 | 2.69 |
| Caliper, mils | 11.8 | 11.5 | 12.7 | 12.7 | 12.0 | 13.0 | 13.0 |
| Tensile, lbs./in | 5.9 | 5.7 | 7.3 | 8.1 | 3.8 | 4.3 | 5.4 |
| Stretch, percent | 0.95 | 1.1 | 0.4 | 0.2 | 0.75 | 0.2 | 0.2 |
| Wet (water) Tensile, lbs./in | 2.1 | 1.85 | 4.2 | 5.3 | 1.3 | 2.6 | 2.9 |
| Wet (methyl isobutyl ketone) Tensile, lbs./in | 1.65 | 1.45 | 2.85 | 3.8 | 0.95 | 2.0 | 3.1 |
| Kerosene value, percent* | 97.1 | 116.8 | 108.0 | 100.3 | 169.4 | 148.4 | 138.0 |
| Density, lbs./cu. ft | 24.0 | 24.8 | 24.8 | 25.0 | 23.7 | 24.5 | 24.9 |

*The kerosene value is a measure of the organic pick-up or sorption and retention capacity of the paper.

EXAMPLE II

A further evaluation of the relative properties of continuous machine produced papers comprised a standard formulation as the control and comparable formulations including fine glass fibers or aluminum acid phosphate solids, or both. All paper samples of this example consisted of a four ply product produced from the given compositions on a continuous forming, four cylinder mold pilot plant machine which simulates on a reduced scale, a commercial production paper manufacturing process. Unlike the prior example wherein the proportions were based upon the weight of the base paper prior to the depositing therein of the aluminum acid phosphate solids to demonstrate the effects of varying proportions of the said solids on like papers, in this example the proportions are based upon over-all weight of the particular ultimate products or as they are to be utilized for resin saturation to enable comparison and illustrate the over-all properties of the products of this invention. This series of property evaluations demonstrates the relative characteristics of identically produced, continuous machine manufactured papers of convention composition and containing glass fiber but no aluminum acid phosphate solids, or aluminum acid phosphate solids without glass fiber, or both glass fiber and aluminum acid phosphate solids. The data are given in Table II.

Table II

| Composition | Standard, percent | A, percent | B, percent | C, percent | D, percent |
|---|---|---|---|---|---|
| Munro mine chrysotile fiber Grade 3W | 97 | 94 | 92 | 90.5 | 75 |
| Fine glass fiber | | | 5 | 5 | 19.5 |
| Acrylic resin | 3 | 3 | 3 | 3 | 3 |
| Aluminum acid phosphate | | 3 | | 1.5 | 2.5 |

| Physical Properties | Standard | A | B | C | D |
|---|---|---|---|---|---|
| Basis weight, lb./100 ft.² | 1.9 | 3.2 | 2.7 | 2.3 | 3.0 |
| Caliper, mils | 9 | 14 | 12 | 10 | 14 |
| Bulk, percent | 0.45 | 0.43 | 0.42 | 0.45 | 0.46 |
| Mullen, p.s.i | 7 | 11 | 11 | 7 | 7 |
| Tensile, lbs./in. MD | 8.7 | 16.4 | 14.0 | 13.3 | 14.5 |
| Tensile, lbs./in. CD | 6.6 | 11.2 | 9.5 | 9.2 | 10.3 |
| Stretch, percent MD | 1.2 | 0.5 | 1.3 | 0.3 | 0.7 |
| Stretch, percent CD | 1.7 | 0.8 | 1.5 | 0.7 | 0.8 |
| Tear, grams MD | 27 | 42 | 36 | 30 | 37 |
| Tear, grams CD | 32 | 57 | 48 | 37 | 47 |
| Gurley Stiffness, grams MD | 0.28 | 1.5 | 0.69 | 0.76 | 1.4 |
| Gurley Stiffness, grams CD | 0.21 | 1.0 | 0.48 | 0.44 | 1.1 |
| Gurley Densometer, sec./100 cc. | 33 | 47 | 39 | 33 | 29 |
| Kerosene value, percent | 123 | 98 | 114 | 113 | 126 |
| Wet (water) Tensile, lb./in. MD | 2.9 | 7.7 | 4.5 | 6.7 | 7.4 |
| Wet (methyl ethyl ketone) Tensile, lb./in. MD | 3.0 | 7.8 | 4.0 | 5.8 | 7.4 |
| Ash, percent | 84.25 | 84.8 | 84.65 | 85.0 | 86.1 |

MD denotes machine direction or parallel to the web formation and CD cross machine direction or perpendicular to web formation.

Although the characteristics of paper products, particularly those such as bulk and in turn absorptiveness, strength, etc., are known to vary considerably depending upon the means of sheet formation, the foregoing examples establish the decided advantages and improvements in essential properties of the novel and claimed paper products regardless of the technique or means of manufacture, that is whether batch or continuous machine produced.

The papers of the foregoing compositions or those of this invention, in addition to their markedly increased wet strength, will take up and retain at least about 40% and up to approximately 65% by weight of thermosetting resin saturants including those of high viscosities. Suitable but common thermosetting resin saturants comprise the phenolic resins, unsaturated polyester resins, and epoxy resins, and mixtures thereof. Thermosetting resin saturated papers of the composition of this invention are useful in the molding of many products, and in particular high temperature transitory or ablative insulations such as are commonly employed in and about rocket engines and nozzles.

As used throughout this specification and in the appended claims, the term "bulk" is to be understood and defined as the caliper or sheet thickness in inches divided by the sheet weight in pounds per 100 square feet of paper, times 100.

It will be understood that the foregoing details are given for purposes of illustration, not restriction, and that variations within the spirit of this invention are intended to be included within the scope of the appended claims.

I claim:

1. A porous, flexible asbestos-glass fiber paper having a bulk of at least 0.30 wherein bulk is defined as the thickness of the paper in inches divided by the paper weight in pounds per 100 square feet times 100, consisting essentially of approximately 60% to 91.5% by weight of harsh asbestos fibers, approximately 5% to 25% by weight of fine glass fibers having a fiber diameter averaging less than about 3 microns, approximately 2% to 10% by weight of thermoplastic resin binder dispersed throughout the fibrous constituents, and about 1.5% to 15% by weight of aluminum acid phosphate solids.

2. The paper of claim 1 wherein the harsh asbestos fibers are sized at least 70% by weight retained on 200 mesh standard screen sieve, and at least about 50% by weight of said fibers retained on 200 mesh standard screen sieve pass 28 mesh standard screen sieve and are retained on 100 mesh standard screen sieve.

3. The paper of claim 2 wherein the resin binder is an acrylic resin.

4. A porous, flexible asbestos-glass fiber paper having a bulk of at least 0.30 wherein bulk is defined as the thickness of the paper in inches divided by the paper weight in pounds per 100 square feet times 100, consisting essentially of 75% to 90% by weight of harsh asbestos fibers, approximately 8% to 20% by weight of fine glass fibers having a diameter averaging from about 3 microns to 0.5 micron, approximately 2% to 5% by weight of thermoplastic resin binder dispersed throughout the fibrous constituents, and about 2% to 10% by weight of aluminum acid phosphate solids.

5. The paper of claim 4 wherein the harsh asbestos fibers are sized at least 70% by weight retained on 200 mesh standard screen sieve, and at least about 50% by weight of said fibers retained on 200 mesh standard screen sieve pass 28 mesh standard screen sieve and are retained on 100 mesh standard screen sieve.

6. The paper of claim 5 wherein the resin binder is an acrylic resin.

7. A porous, flexible asbestos-glass fiber paper having a bulk of at least 0.30 wherein bulk is defined as the thickness of the paper in inches divided by the paper weight in pounds per 100 square feet times 100, consisting essentially of approximately 84% by weight of harsh asbestos fibers, approximately 10% by weight of fine glass fibers having a fiber diameter averaging from about 1 micron to 0.5 micron, approximately 3% by weight of thermoplastic resin binder dispersed throughout the fibrous constituents, and about 3% by weight of aluminum acid phosphate solids.

8. The paper of claim 7 wherein the harsh asbestos fibers are sized at least 70% by weight retained on 200 mesh standard screen sieve, and at least about 50% by weight of said fibers retained on 200 mesh standard screen sieve pass 28 mesh standard screen sieve and are retained on 100 mesh standard screen sieve.

9. The paper of claim 8 wherein the resin binder is an acrylic resin.

References Cited by the Examiner

UNITED STATES PATENTS

| 2,772,157 | 11/56 | Cilley et al. | 162—145 |
| 2,797,163 | 6/57 | Smith et al. | 162—145 |
| 3,007,841 | 11/61 | Breiner et al. | 162—145 |
| 3,053,727 | 9/62 | Adomshick et al. | 162—136 |

DONALL H. SYLVESTER, *Primary Examiner.*

MORRIS O. WOLK, *Examiner.*

UNITED STATES PATENT OFFICE
CERTIFICATE OF CORRECTION

Patent No. 3,212,960　　　　　　　　　　　　　　　　October 19, 1965

Robert G. Quinn

It is hereby certified that error appears in the above numbered patent requiring correction and that the said Letters Patent should read as corrected below.

Column 1, line 27, for "products" read -- product --; column 3, line 50, for "particularly" read -- particular --; line 73, strike out "produced"; column 4, line 10, for "sheets," read -- sheets --; line 58, for "simulates" read -- simulates, --; line 71, for "convention" read -- conventional --; column 5, Table II, under the heading "A, percent" opposite "Acrylic resin" the indistinct number should read -- 3 --.

Signed and sealed this 27th day of September 1966.

(SEAL)
Attest:

ERNEST W. SWIDER　　　　　　　　　　　　　　EDWARD J. BRENNER
Attesting Officer　　　　　　　　　　　　　　　　Commissioner of Patents